United States Patent [19]
Mansson

[11] 3,900,793
[45] Aug. 19, 1975

[54] EDDY CURRENT TESTING APPARATUS INCLUDING A ROTATING HEAD WITH PROBE AND NULL CIRCUIT MEANS MOUNTED THEREON INCLUDING ROTARY TRANSFORMER WINDINGS

[75] Inventor: Sven E. Mansson, Hollviksnas, Sweden

[73] Assignee: Magnetic Analysis Corporation, Mount Vernon, N.Y.

[22] Filed: Feb. 25, 1974

[21] Appl. No.: 445,116

[52] U.S. Cl. .................... 324/40; 324/37; 324/37 R
[51] Int. Cl. ............................................. G01r 33/12
[58] Field of Search ........................ 324/34, 37, 40

[56] References Cited
UNITED STATES PATENTS

| | | | |
|---|---|---|---|
| 2,548,397 | 4/1951 | Schaevitz | 324/34 R |
| 2,878,447 | 3/1959 | Price et al. | 324/37 |
| 3,004,215 | 10/1961 | Datt et al. | 324/37 |
| 3,025,460 | 3/1962 | Callan et al. | 324/37 |
| 3,310,736 | 3/1967 | Bayly et al. | 324/34 |

FOREIGN PATENTS OR APPLICATIONS
573,152   11/1945   United Kingdom ................. 324/37

OTHER PUBLICATIONS
German Pat. Application D 18728 1X/42k, Mar. 1, 1956.

*Primary Examiner*—Robert J. Corcoran
*Attorney, Agent, or Firm*—Pennie & Edmonds

[57] ABSTRACT

In rotary eddy current testing apparatus having one or more probes mounted on a rotating head through which an object is fed, a null circuit is mounted on the rotating head and includes the probe(s). Alternating or pulsed current is supplied to the probe(s) through a first rotary transformer and the output signals of the null circuit are supplied to indicating apparatus through a second rotary transformer, thereby substantially reducing or eliminating modulation of the output signals by variations in the rotary transformer coupling. Advantageously the second rotary transformer has a pair of bifilar windings on the rotating head forming part of a bridge circuit including the probe(s).

6 Claims, 9 Drawing Figures

3,900,793

EDDY CURRENT TESTING APPARATUS INCLUDING A ROTATING HEAD WITH PROBE AND NULL CIRCUIT MEANS MOUNTED THEREON INCLUDING ROTARY TRANSFORMER WINDINGS

BACKGROUND OF THE INVENTION

Eddy current testing apparatus for the non-destructive testing of objects is known in which one or more probes are mounted on a rotating head through which the object to be tested is fed. Each probe is energized with an alternating current and induces eddy currents in the object which vary in the presence of defects or flaws therein, and the variations are sensed by the probe and supplied to circuits which produce indications of the defects or flaws. The indications may be used for visual display, chart recording, marking the defects, segregating defective objects, actuating an alarm, etc.

In known apparatus, a rotary transformer is used to supply the energizing alternating current to the probe(s) on the rotating head and deliver signals, as modulated by defects or flaws, to the indicating circuits. Commonly a null bridge circuit including the stationary winding of the rotary transformer is used to supply the alternating current to the probe(s), and to produce a null output in the absence of defects or flaws in the object and output signals varying from the null in the presence of defects or flaws.

In known commercial apparatus, rotational speeds of 900 to 3600 rpm have frequently been employed, with selectable sinusoidal alternating current frequencies in the range of 22 KHz to 600 KHz. Other rotational speeds and test frequencies can be employed. In general the test frequency is high compared to the rotational speed so that many cycles of the test frequency occur in one revolution.

It is difficult, if not impractical, to build a rotary transformer with no variation in the coupling between the windings as the movable winding rotates. In the known arrangement described above, any such variation modulates the alternating current supplied from the fixed to the rotating winding, and consequently modulates the output of the bridge circuit. Such modulation may mask small flaw signals and hence reduce the overall sensitivity of the apparatus.

The present invention is directed to an improved apparatus in which the effect of the variation in coupling with rotation may be rendered negligible, or at least greatly reduced. Although particularly described in connection with sinusoidal test currents, the invention is also applicable to apparatus using a square wave alternating current source or to apparatus using D-C pulse excitation.

SUMMARY OF THE INVENTION

In accordance with the invention, a pair of rotary transformers are employed, one of which supplies energizing alternating current or pulses to the rotating head. Null circuit means are mounted on the rotating head and includes eddy current probe means mounted on the head. The energizing current is supplied to the null circuit means to energize the probe means and produce a null output in the absence of defects or flaws in the object under test, and output signals varying from the null in the presence of defects or flaws. The resultant output signals are supplied through the second rotary transformer to the indicating circuits.

With this arrangement any modulation due to the variation in the coupling of the first transformer as it rotates affects both branches of the null circuit equally, so that nulling is not affected if the circuit is properly balanced. Any variation in the coupling of the second rotary transformer will affect the output signals, but the effect will be small and usually negligible.

Preferably the second rotary transformer has two windings on the rotating head which are connected in a null bridge configuration with the probe means, so as to serve the double function of nulling on the rotating head and transferring the flaw signals to the stationary winding thereof. Advantageously the two windings on the rotating head are bifilarly wound.

DESCRIPTION OF THE SPECIFIC EMBODIMENT

Figure 1:
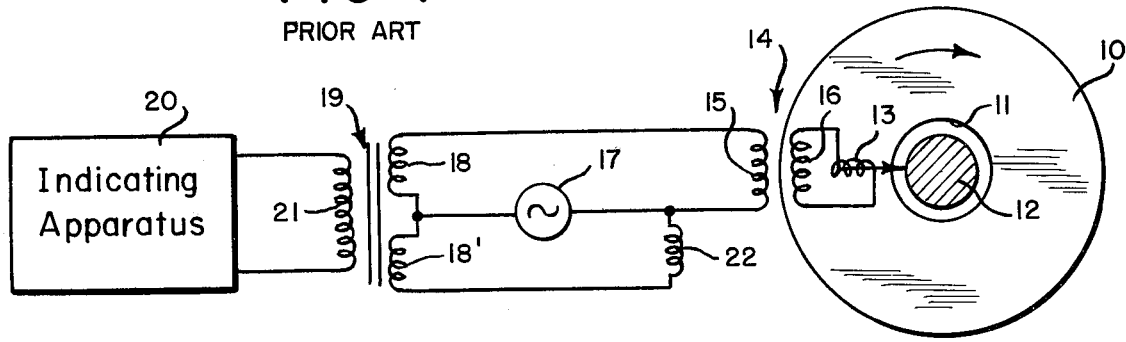
FIG. 1 illustrates a known arrangement for rotary eddy current testing apparatus.

Referring to FIG. 1, a known arrangement is shown. Rotating head 10 has an opening 11 through which object 12 is fed during testing. A probe 13 is mounted on the rotating head and may be a coil with a ferrite core, or other suitable design. The probe is energized through a rotary transformer 14 including a stationary winding 15 and a winding 16 mounted on the rotating head.

An alternating current source 17 is connected across one diagonal of a bridge circuit including a pair of windings 18, 18' of transformer 19 having an output winding 21. Windings 18 and 18' form two legs of the bridge and rotary transformer 14 with coupled probe 13 forms a third leg. The fourth leg is an inductance 22. The bridge is balanced so that, in the absence of defects or flaws in object 12, a null signal output is produced in winding 21. The alternating current supplied to probe 13 may be considered as a carrier and, in the presence of defects or flaws in object 12, the carrier is modulated in amplitude and/or phase. This produces an unbalanced signal in the bridge and yields output signals in winding 21 varying from the null condition. These signals are supplied to indicating apparatus generally designated as 20.

With perfect initial balancing of the bridge and uniform coupling in the rotary transformer, and disregarding other effects such as off-centering or vibration of object 12, the output in winding 21 will be only the desired flaw signal modulation. However, any variation in the coupling will modulate the carrier as supplied to probe 13. Thus the coupling modulation will appear in winding 21 and may mask small flaw signals.

As an example, assume that the carrier generator voltage is 10 volts and that 5 volts is applied to the rotary transformer. A variation in the coupling of 1% would produce a 50 millivolt signal in winding 21. Actually, it may be difficult in practice to keep the coupling variation to 1%, due to run-out in conventional bearings and other mechanical tolerances, and the variation may be considerably greater.

Figure 2:
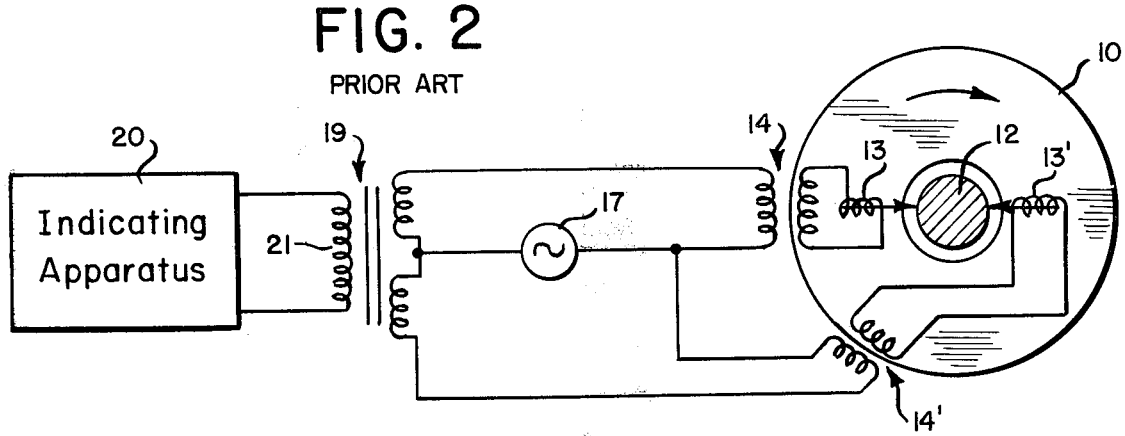
FIG. 2 is a possible modification of FIG. 1.

FIG. 2 shows a modification of FIG. 1 in which two probes 13, 13' are mounted on the rotating head. The probes may be 180° apart for two probe flaw detection, as shown, or close together for differential detection. Frequently the probes are connected in parallel. However, as shown, the probes are separately energized through two rotary transformers 14, 14' which form two legs of the bridge circuit. Any variation in coupling in the rotary transformers will produce effects similar to FIG. 1, and the effects may be worse since the two rotary transformers are likely to produce different coupling modulation patterns.

Figure 3:
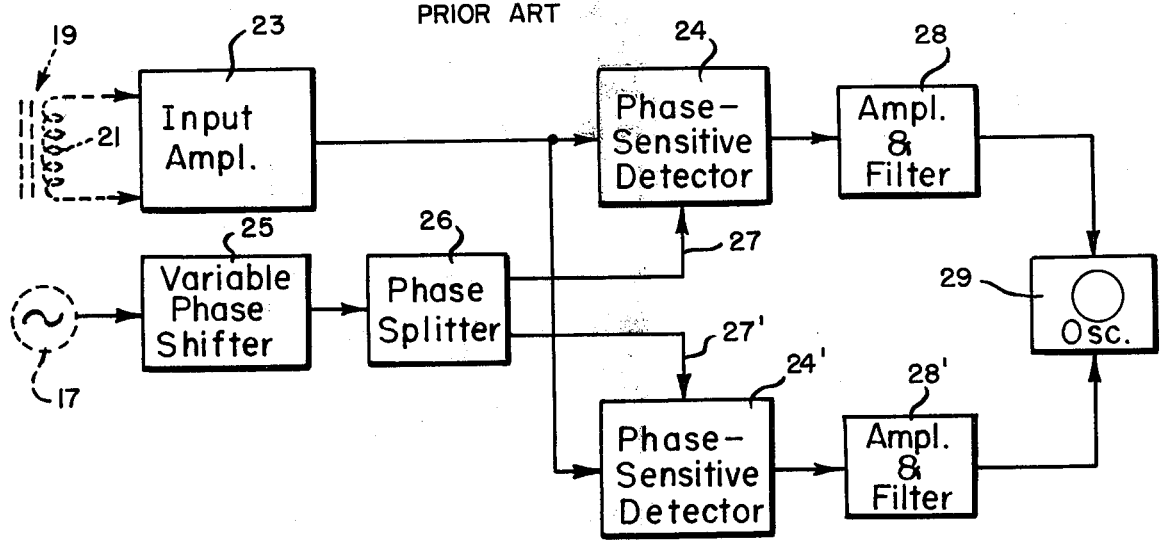
FIG. 3 is a block diagram of a known indicating circuit usable in the present invention.

FIG. 3 shows a known arrangement of indicating circuits which may be used in block 20 of the figures. The output in winding 21 of transformer 19 is amplified in 23 and supplied to two phase-sensitive detectors 24, 24'. The output of carrier generator 17 is supplied through a variable phase shifter 25 and phase splitter 26 to produce gate outputs in lines 27, 27' which are 90° apart but adjustable with respect to the carrier as applied to the probe or probes on the rotating head. The gate outputs are applied to detectors 24, 24' to yield outputs in phase quadrature which are amplified and filtered in 28, 28' and applied to the vertical and horizontal deflecting circuits of oscilloscope 29. This produces a polar display of the amplitude and phase of the defects or flaws. The output of one channel, or a combination of the outputs of both channels, may be used for actuating an alarm, marking defective regions of the object, etc.

Figure 4:
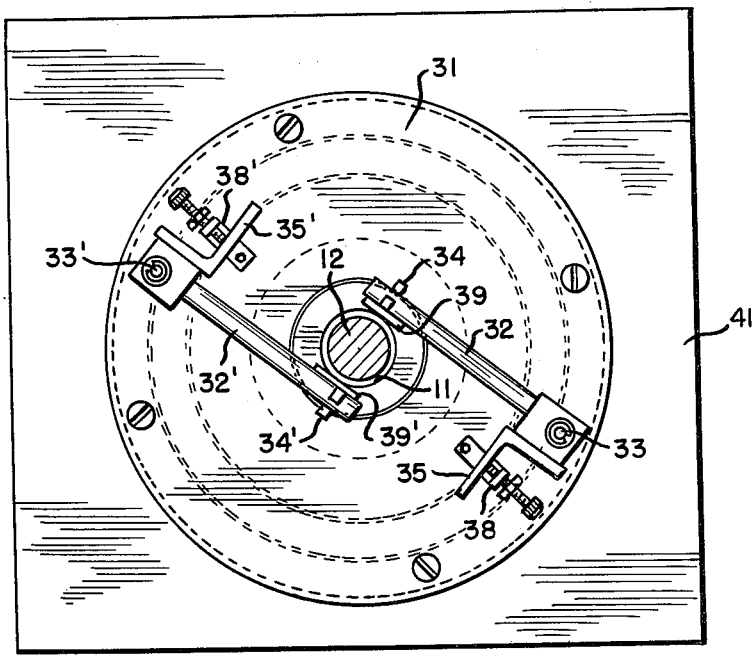
FIG. 4 illustrates a known type of probe arrangement usable in the present invention.
Figure 5:
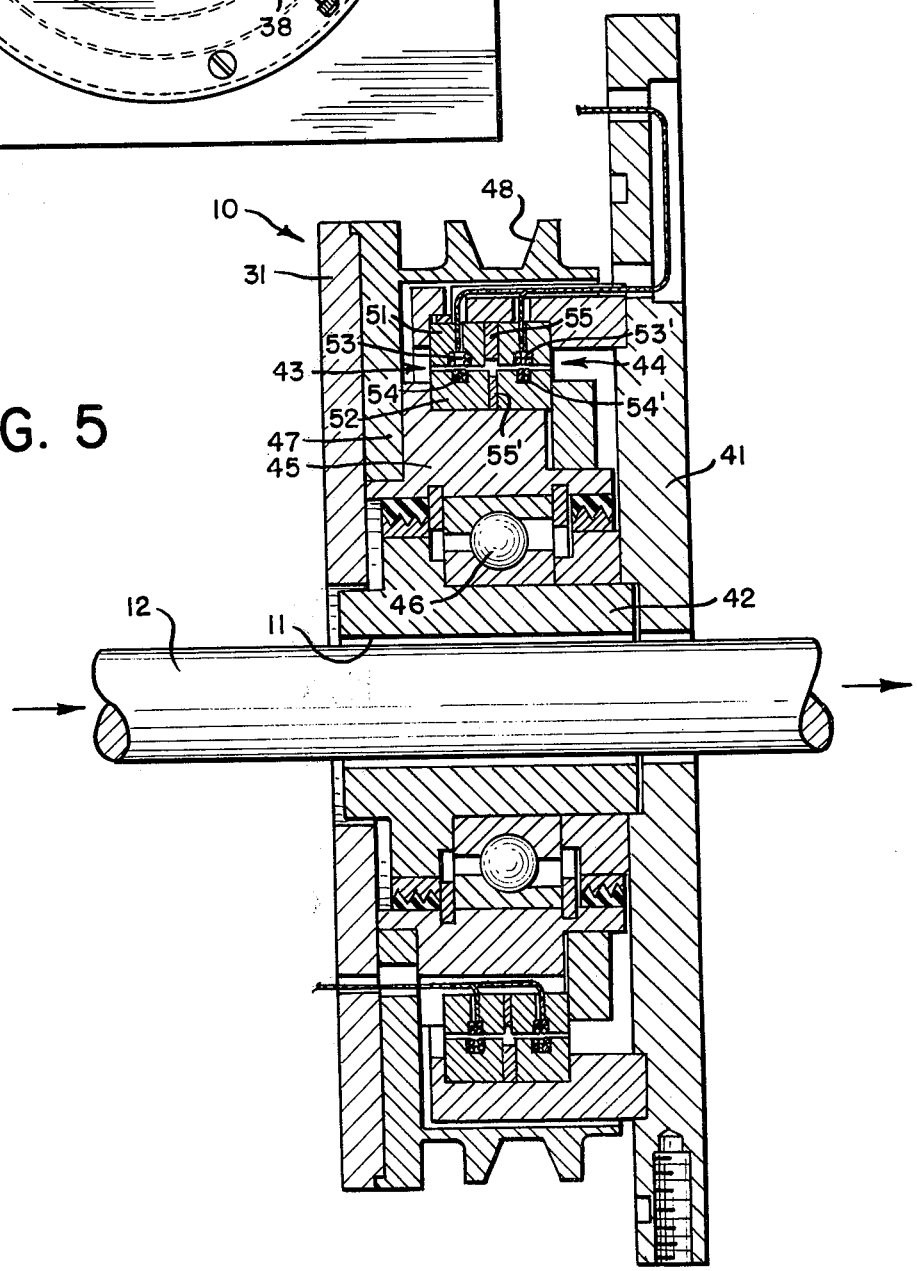
FIG. 5 illustrates a rotary head with a pair of ferrite core rotary transformers usable in the present invention.

Referring to FIGS. 4 and 5, a rotary head generally designated as 10 has a face plate 31 on which two pickup arms 32, 32' are pivotally mounted at 33, 33'. Sensing heads or probes 34, 34' are mounted at the free ends of the arms, and each may be a ferrite core with an encircling coil. Counterweights 35, 35' are attached to the arms so that, when the head is rotated, centrifugal force brings the probes inward in position to test an object 12 passing through a central opening 11 in the head. Springs (not shown) may be used to bias the pickup arms outward when the head is at rest. Adjustable stops 38, 38' may be provided for limiting the inward movement of the probes so that there is a small air gap between each probe and the object 12. Shoes 39, 39' may be provided so that if the object varies excessively, it will force the probes outward and avoid damage.

As seen in FIG. 5, a stationary mounting plate 41 supports a hub 42 and the stationary portions of rotary transformers 43 and 44. The rotating portions are mounted on member 45. Bearings 46 mount the head for rotation about hub 42. A rotating mounting plate 47 is affixed to member 45 and has a drum extension provided with an annular groove 48 for a V-belt driven by a motor (not shown). Face plate 31 is suitably attached to mounting plate 47. The pickup arms are not shown in this figure to avoid complexity of illustration.

Each rotary transformer comprises a pair of annular ferrite core members 51, 52, each having a U-shaped cross-section with annular slots 53 and 54 in which stationary and rotating windings are positioned, respectively. Aluminum spacers 55, 55' between the ferrite cores assist in isolating the transformer fields. Desirably the slot 54 is narrower than 53, and the pole faces on either side of 54 wider than those on either side of 53, so that slight axial misalignment of the core members will not materially affect the magnetic field between them.

Figure 6:
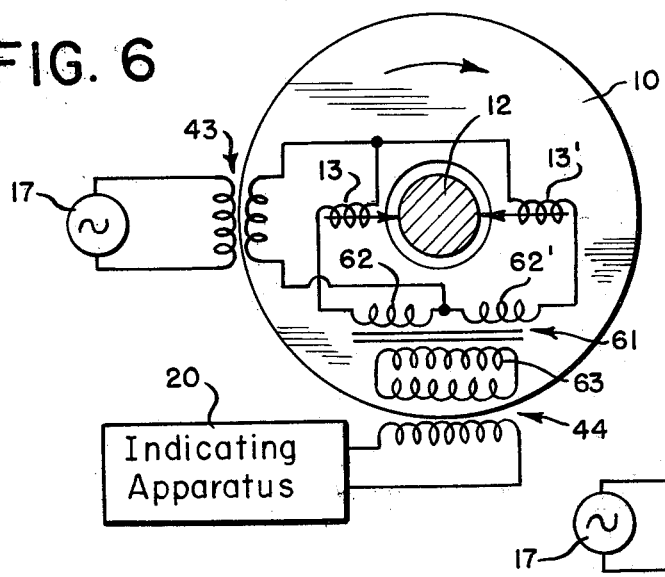
FIG. 6 illustrates one embodiment of the invention.

Referring to FIG. 6, an arrangement in accordance with the invention is shown. Here a nulling transformer 61 is mounted on the rotating head 10 and includes a pair of windings 62, 62' connected in a bridge configuration with a pair of probes 13, 13'. The probes may be 180° apart as shown, or close together, as mentioned in connection with FIG. 2. Or, one probe could be replaced by an equivalent inductance. Alternating current is supplied by generator 17 through one rotary transformer 43 across one diagonal of the bridge. With the bridge balanced, a null output is produced in winding 63 of the nulling transformer 61. When defects or flaws are detected, unbalanced signals will be produced in the bridge and corresponding output signals will occur in coil 63. These are supplied through a second rotary transformer 44 to indicating apparatus 20.

Considering the effect of a variation in the coupling in transformer 43 as it rotates, the resulting coupling-modulated carrier will be applied to both sides of the bridge circuit so that, if the bridge is precisely balanced in the absence of a flaw, the coupling modulation will be in opposition in coils 62, 62' and hence nulled out or cancelled. Therefore no coupling-modulated carrier will appear in coil 63 and no output will appear in rotary transformer 44. When a probe detects a flaw, however, the flaw modulates the carrier applied to the probe and produces an unbalanced signal in the bridge which results in a flaw-modulated carrier output in coil 63 which is delivered through rotary transformer 44 to the indicating apparatus 20.

If the bridge is not precisely balanced in the absence of a flaw, there will be a small coupling-modulated signal in coil 63, but its magnitude can be kept far below that in the circuits of FIGS. 1 and 2. For example, it is feasible to balance the bridge sufficiently accurately to keep the unbalanced signal to, say, 5 millivolts for a 10 volt input carrier. If the coupling modulation is 1% of the carrier, the modulation will be only 0.05 millivolts as compared to 50 millivolts in the example given above for FIG. 1, a reduction of a thousand to one. If rotary transformer 44 has a 1% coupling variation, there will be a 1% variation in the flaw signal amplitude, but this is of negligible importance.

Figure 7:
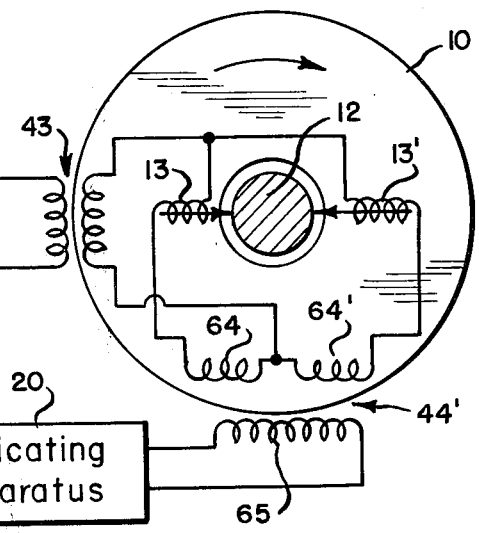
FIGS. 7–9 illustrate several preferred embodiments of the invention.

FIG. 7 shows a preferred form of the invention in which rotary transformer 44' has a pair of windings 64, 64' wound in slot 54' of the rotary head (FIG. 5), preferably bifilarly wound. Windings 64, 64' form part of the nulling bridge circuit as well as serving to couple an unbalanced flaw signal to stationary winding 65. One of probes 13, 13' could be replaced by a dummy probe or an inductance if desired, as previously explained. The functioning of the circuit is similar to that of FIG. 6, but the arrangement is considerably simpler since no additional components need be mounted on the rotating head.

Figure 8:
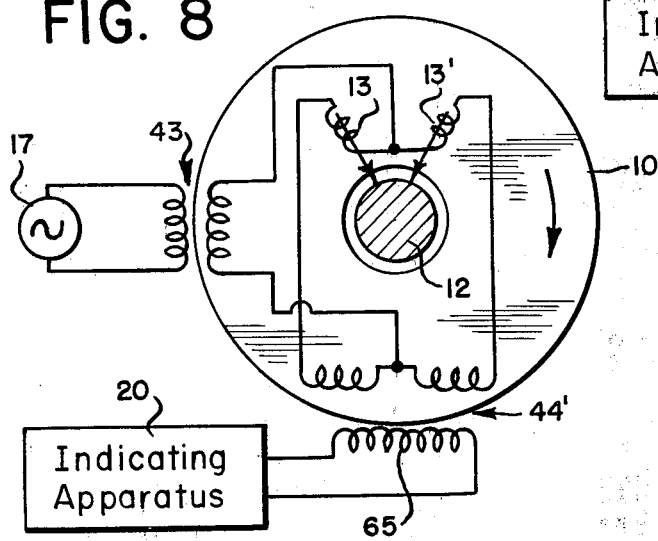

FIG. 8 is similar to FIG. 7, except that the probes 13, 13' are close together for differential detection of a flaw.

Figure 9:
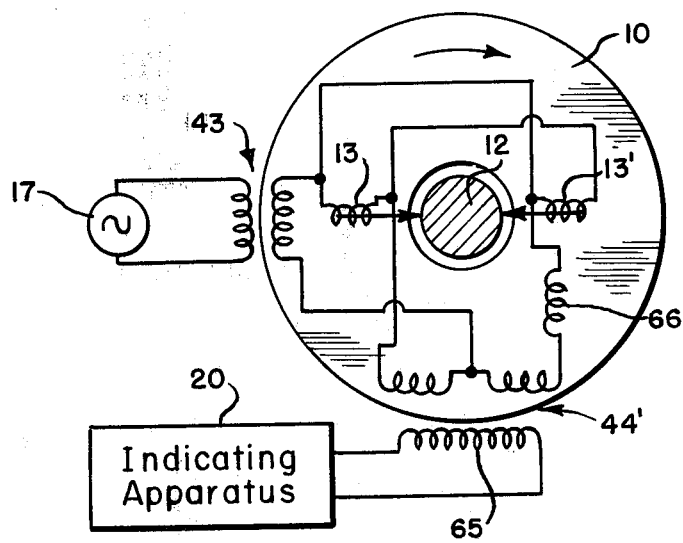

FIG. 9 shows an arrangement in which probes 13, 13' are 180° apart but connected in parallel to form one arm of the bridge circuit, and a balancing inductance 66 is mounted on the rotating head to form another arm of the bridge. This reduces adverse effects due to vibration of object 12 as it is fed through the rotating head. Such vibration may cause the object under test to move closer to one probe and away from the other, thus changing the carrier amplitude in opposite directions in the two probes. In FIG. 7, where the probes are in separate arms of the bridge circuit, the signal outputs are in series aiding, thereby producing a vibration-modulated signal in the output coil 65. However, in FIG. 9, since the two probes are in parallel, an increase in carrier amplitude in one probe is at least partially compensated by the decrease in amplitude in the other, thereby reducing the magnitude of vibration signals in output coil 65.

In the foregoing embodiments a sine wave source is employed to energize the probes, and the operation has been explained with respect to the modulation of the carrier from such a source. If desired, an alternating current source in the form of a square wave generator may be employed. Also, pulse energization by D-C pulses of desired duty cycle may be employed, particularly with subsequent filtering as described, for example, in Mansson application Ser. No. 317,140, filed Dec. 21, 1972, now U.S. Pat. No. 3,786,347. In such cases the operation will be generally as described above, although differing in detail.

The null circuits specifically described are bridge type circuits using nulling transformer windings. However, other types of nulling arrangements are possible and may be employed if desired. Also, different indicating circuits, different rotating head constructions, and different probe designs may be employed as meets the requirements of a particular application.

I claim:

1. Eddy current testing apparatus for the nondestructive testing of objects which comprises
   a. a rotating head through which an object is fed,
   b. a source of alternating or pulsed current,
   c. a first rotary transformer having a stationary winding supplied from said source and a winding on said rotating head,
   d. probe means mounted on said rotating head for inducing eddy currents in said object when energized with alternating or pulsed current and responding to variations in the eddy currents in the presence of defects or flaws in the object,
   e. a second rotary transformer having a stationary winding and a pair of windings on said rotating head,
   f. null circuit means mounted on said rotating head and including said probe means and said pair of windings of the second rotary transformer for receiving alternating or pulsed current from said first rotary transformer and producing in the stationary winding of the second rotary transformer a null signal output in the absence of defects or flaws in a said object and output signals varying from said null in the presence of defects or flaws,
   g. and quadrature-detecting indicating means supplied with the output signals in the stationary winding of said second rotary transformer for indicating defects or flaws in said object.

2. Apparatus according to claim 1 in which said null circuit means is a bridge circuit in which said pair of windings of the second rotary transformer are connected in two arms of the bridge, respectively, and said probe means includes at least one probe connected in another arm of the bridge.

3. Apparatus according to claim 2 in which said pair of windings of the second rotary transformer are bifilarly wound.

4. Apparatus according to claim 1 in which said null circuit means is a bridge circuit in which said pair of windings of the second rotary transformer are connected in two arms of the bridge, respectively, and said probe means includes a pair of probes connected in respective other arms of the bridge.

5. Apparatus according to claim 1 in which said null circuit means is a bridge circuit in which said pair of windings of the second rotary transformer are connected in two arms of the bridge, respectively, and said probe means includes a pair of probes spaced approximately 180° apart and connected in parallel to form another arm of said bridge.

6. Apparatus according to claim 5 including an inductance connected in a fourth arm of said bridge circuit.

* * * * *